(12) United States Patent
Braga et al.

(10) Patent No.: US 9,306,363 B1
(45) Date of Patent: Apr. 5, 2016

(54) ACTIVE BIDIRECTIONAL MODE-LOCKED LASERS AND APPLICATIONS TO ACCURATE MEASUREMENTS IN NAVIGATION SYSTEMS

(75) Inventors: Alexandre B. Braga, Salvador (BR); Jean-Claude Diels, Albuquerque, NM (US); Ronald R. Kay, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 1218 days.

(21) Appl. No.: 13/253,386

(22) Filed: Oct. 5, 2011

Related U.S. Application Data

(60) Provisional application No. 61/390,049, filed on Oct. 5, 2010.

(51) Int. Cl.
*G01B 7/30* (2006.01)
*G01B 7/14* (2006.01)
*H01S 3/067* (2006.01)
*G01B 7/00* (2006.01)

(52) U.S. Cl.
CPC ............ *H01S 3/06791* (2013.01); *G01B 7/003* (2013.01); *H01S 3/06712* (2013.01)

(58) Field of Classification Search
CPC ... H01S 3/06712; H01S 3/06791; H01S 3/07; H01S 3/106; H01S 3/1061; H01S 3/1112; H01S 3/1608; H01S 3/06716; H01S 3/0675; H01S 3/094042; H01S 3/10023; H01S 3/1305; H01S 3/094003; H01S 3/0941
See application file for complete search history.

(56) References Cited

U.S. PATENT DOCUMENTS

| | | | |
|---|---|---|---|
| 8,379,285 B1 * | 2/2013 | Diels ..................... | H01S 3/1121 359/239 |
| 2010/0061407 A1 * | 3/2010 | Nicholson ........... | H01S 3/06791 372/6 |
| 2010/0296527 A1 * | 11/2010 | Nicholson ........... | H01S 3/06791 372/6 |

OTHER PUBLICATIONS

Arissian, Ladan, et al., "Investigation of carrier to envelope phase and repetition rate: fingerprints of mode-locked laser cavities", Journal of Physics B: Atomic, Molecular and Optical Physics 42 (2009) 183001, (2009), 1-25.
Bergh, A., et al., "An Overview of Fiber-Optic Gyroscopes", J. Lightwave Tech. LT-2, (1984), 91-107.

(Continued)

*Primary Examiner* — Jay Patidar
(74) *Attorney, Agent, or Firm* — Schwegman Lundberg & Woessner, P.A.

(57) ABSTRACT

In various embodiments, systems and methods can be structured to provide efficient active bidirectional mode-locked lasers, which can be used as intracavity phase interferometer (IPI) sensors. Stable bidirectional mode-locking can be achieved by a combination of a passive mechanism, a passively driven active mechanism, and a beat note detection system. Such systems can be used in guidance, navigation, and control systems, where attitude control of a vehicle relies on accurate measurements of its position and motion. In various embodiments, a detection system can be based on an all fiber intracavity phase interferometer (IPI) active laser capable of delivering accurate simultaneous measurements of all three degrees of rotation and position in a single, compact, cost effective unit. A variation of the same system can include a linear cavity laser for accurate measurements of acceleration without the use of any inertial masses. Additional apparatus, systems, and methods are disclosed.

19 Claims, 16 Drawing Sheets

(56) References Cited

OTHER PUBLICATIONS

Bohn, Matthew J, et al., "Measuring intracavity phase changes using double pulses in a linear cavity", Optics Letters, 22, (1997), 642-44.

Braga, A., et al., "Bidirectional mode-locked fiber ring laser using passively controlled threshold gating", Optical Science & Engineering, CLEO/QUELS: 2010, (May 16-21, 2010, San Jose, CA), (2010), 2 pgs.

Braga, A., et al., "Bidirectional mode-locked fiber ring laser using self-regenerative, passively controlled, threshold gating", Optics Letters, 35(15), (2010), 1-3.

Braga, A. B., et al., "Radio Frequency Self-Regenerated Locked Optical Oscillator", U.S. Appl. No. 61/203,091, filed Dec. 18, 2008, 14 pgs.

Chow, W. W., et al., "The Ring Laser Gyro", Rev. Mod. Phys. 57 (1), (1985), 61-104.

Curtin, M., et al., "Phase-Locked Loops for High-Frequency Receivers and Transmitters: Part 2", Analog Dialogue 33 (5), (May 1999), 1-4.

Curtin, M., et al., "Phase-Locked Loops for High-Frequency Receivers and Transmitters: Part I", Analog Dialogue 33 (3), (Mar. 1999), 1-4.

Diels, J. C., et al., "Influence of Wavefront Conjugated Coupling in the Operation of a Laser Gyro", Optics Letters, vol. 6, No. 5, (1981), 219-221.

Escamilla, B. I., et al., "A Mode-Locked Fiber Laser Using a Sagnac Interferometer and Nonlinear Polarization Rotation", J. Optics A. 5, (2003), S225-S230.

Fermann, M. E., et al., "Passive Mode Locking by Using Nonlinear Polization Evolution in a Polarization-Maintaining Erbium-Doped Fiber", Optical Letters, vol. 18, No. 11, (1993), 894-896.

Kieu, K., et al., "All-fiber bidirectional passively mode-locked ring laser", Optics Letters, 33(1), (2008), 64-66.

Kiyan, Roman, et al., "En Er-Doped Bidirectional Ring Fiber Laser with 90 degree Faraday Rotator as Phase Nonreciprocal Element", IEEEE Photonics Technology Letter, vol. 10, No. 3, (Mar. 1998), 340-342.

Kuzin, E. A., et al., "Fiber Laser Mode Locked by a Sagnac Interferometer With Nonlinear Polarization Rotation", Optics Letters, vol. 26, No. 20, (Oct. 2001), 1559-1561.

Lai, Ming, et al., "Nonreciprocal measurements in femtosecond ring lasers", Optics Letters vol. 17, No. 21, (Nov. 1, 1992), 1535-1537.

Matsas, V. J., et al., "Self-Starting Passively Mode-Locked Fibre Ring Laser Exploiting Nonlinear Polarisation Switching", Electronics Letters, vol. 28, No. 15, (Jul. 1992), 61-66.

Matsas, V. J., et al., "Self-Starting Passively Mode-Locked Fibre Ring Soliton Laser Exploiting Nonlinear Polarisation Rotation", Electronics Letters, vol. 28, No. 15, (1992), 1391-1393.

Meng, X, "Ultrashort pulse OPO ring laser", In CLEO 2000, technical digest, vol. CMW7 Lasers and Electro-Optics Conference, (2000), 122.

Nakazawa, M., et al., "Ideal Phase-Locked Loop (PLL) Operation of a 10GHz Erbium-Doped Fibre Laser Using Regenerative Modelocking As an Optical Voltage Controlled Oscillator", Electronics Letters, vol. 33, No. 15, (Jul. 1997), 3 pgs.

Navarro, M., et al., "Mode-Locked Ring Lasers for Backscattering Measurement of Mirror", Optics Letters 31, (2006), 2864-2866.

Nelson, L. E., et al., "Ultra-Short Pulse Fiber Ring Lasers", Applied Phys. B, 65, (1997), 277-294.

Omenetto, F. G., "Femtosecond Pulses in Optical Fibers", Progress in Optics 44: 85-141, (2002), 85-141.

Sagnac, G., "L'ether lumineux demontre par l'effet du vent relatif d'ether dans un interferometre en rotation uniforme", Comptes Rendux 157: S, (1913), 708-710.

Sagnac, G., "Sur la preuve de la realite de l'ether lumineux par l'experience de l'interferographetourant", Comptes Rendus 157: S, (1913), 1410-1413.

Schmitt-Sody, A., et al., "Intra-Cavity Mode Locked Laser Magnetometer", Optics Comm., (2010), 3 pgs.

Uzunoglu, V., "Synchronous Oscillator Outperforms the PLL", EDN, (Nov. 1999), 111-118.

Velten, A., et al., "Precise Intracavity Phase Measurement in an Optical Parametric Oscillator With Two Pulses Per Cavity Round-Trip", Optical Letters, vol. 35, No. 8, (2009), 1181-1183.

\* cited by examiner

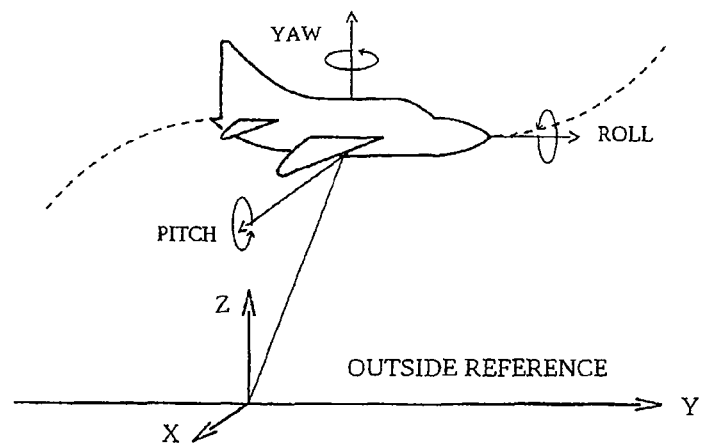
FIG. 1
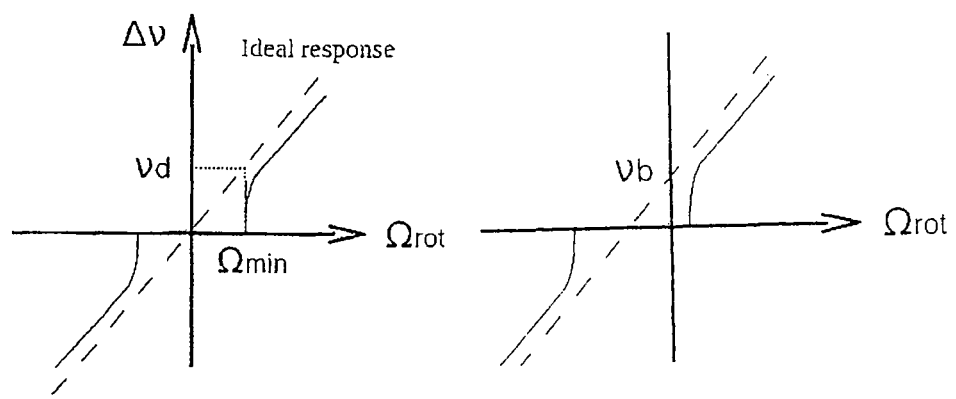
FIG. 6A
FIG. 6B

ACTIVE BIDIRECTIONAL MODE-LOCKED LASERS AND APPLICATIONS TO ACCURATE MEASUREMENTS IN NAVIGATION SYSTEMS

RELATED APPLICATION(S)

This application claims the benefit of priority under 35 U.S.C. 119(e) to U.S. Provisional Patent Application Ser. No. 61/390,049 filed 5 Oct. 2010, which is incorporated herein by reference in its entirety.

GOVERNMENT INTEREST STATEMENT

This invention was made with Government support under Grant No. (NSF) ECS-925526 awarded by the National Science Foundation. The United States Government has certain rights in the invention.

BACKGROUND

In guidance, navigation, and control (GNC) systems, the attitude of a vehicle must be constantly monitored. Such vehicles include satellites, airplanes, unmanned aerial vehicles (UAVs), submarines, ICBNs, other aircraft, and other moving craft. At any given time, attitude control of such a vehicle depends upon precise measurement of its three dimensional angular changes ("pitch", "roll", and "yaw") and its position relative to a frame of reference such as shown in FIG. 1. An error of a single degree could send a vehicle off course, several miles away from its intended trajectory. To ascertain their precise location, vehicles use a number of different on-board instruments. Some instruments are designed for relative (inertial motion) sensing and some instruments are designed for absolute (relative to a target) attitude sensing. For instance, to obtain a complete assessment of a satellite's attitude, navigation controls rely on inertial measurements (autonomous sensing), and absolute measurements (relative to a reference), both detected using two or more separate instruments.

A first class of devices is meant to detect the rate of change (rotation and acceleration) in the attitude of the vehicle, relative to its own inertial frame (autonomous sensing). Some of the most commonly used instruments in this detection system include "spinning mass", "laser", and "hemispherical resonator" gyroscopes, the latter being particularly expensive. The most common inertial navigation systems, however, use ring He—Ne lasers. This concept is more than 40 years old and is outdated. It has the following shortcomings: (i) a high power consumption/low efficiency, (ii) a lifetime limited by the vacuum tube technology, (iii) nonlinearity and zero response at low rotation rate (dead band), and (iv) configurations that occupy a large volume. Another commonly used system is the fiber optic gyro, FOG, which is a passive device that measures a phase shift through interference. In a FOG, the difference in phase induced by rotation (Sagnac effect) is translated into a difference in intensity. As a result, a FOG device can provide a considerably smaller signal to noise ratio and sensitivity than an active laser gyro based on frequency measurement.

A second class of instruments senses the position of an aircraft relative to outside objects. The most common instruments are: "horizon sensors", "orbital gyrocompasses", "sun sensors", "star trackers", and "magnetometers".

BRIEF DESCRIPTION OF THE FIGURES

Embodiments of the invention are illustrated by way of example and not limitation in the figures of the accompanying drawings in which:

FIG. 1 shows a coordinate representation for aircraft navigation system.

FIG. 6A shows effects of frequency lock-in on gyroscopic response of a laser.

FIG. 6B shows effects of intra-cavity peak intensity difference on gyroscopic response of a laser.

DESCRIPTION

The following detailed description refers to the accompanying drawings that show, by way of illustration and not limitation, various example embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 2:
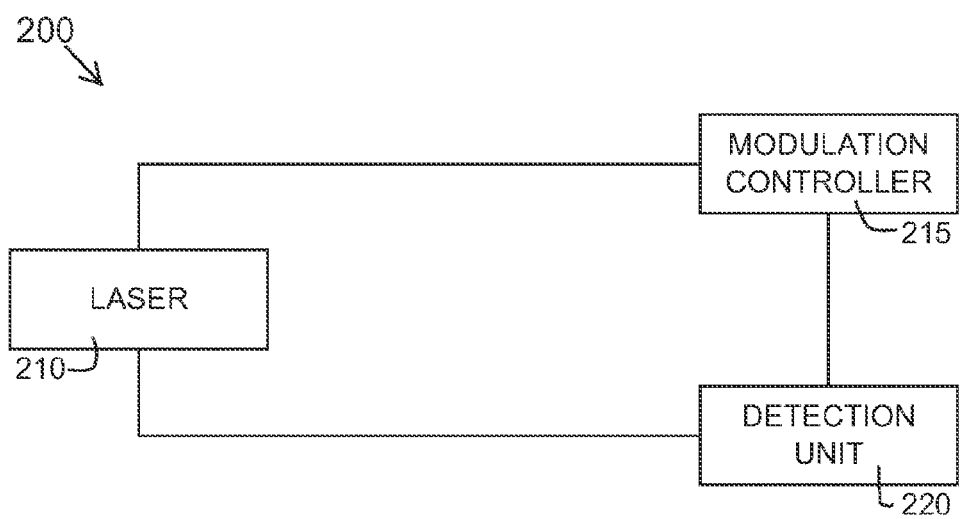
FIG. 2 shows a block diagram of a system operable in sensing arrangements.

FIG. 2 shows a block diagram of a system 200 operable in sensor arrangements. System 200 includes a laser 210, a modulation controller 215 coupled to laser 210, and a detection unit 220 coupled to laser 210 and coupled to modulation controller 215. Modulation controller 215 can be arranged to modulate loss in laser 210. Detection unit 220 can be structured to detect differences in counter-propagating optical signals in laser 210 and to provide a control signal to modulation controller 215. Modulation controller 215 can be arranged to modulate loss in laser 210 based on an oscillation rate of laser 210. System 200 can be structured to provide efficient active bidirectional mode-locked lasers, which can be used as intracavity phase interferometer (IPI) sensors. Stable bidirectional mode-locking can be achieved by a combination of a passive mechanism, a passively driven active mechanism, and a beat note detection system. The passive mechanism can be provided by laser 210 with the passively driven active mechanism provided by modulation controller 215, the beat note detection system provided by detection unit 220.

Laser 210 can include a fiber ring laser. Laser 210 can include a linear laser. Modulation controller 215 can include a pair of modulators biased for no transmission in an absence of a controlling pulse. Fiber ring laser 210, modulation controller 215, and detection unit 215 can be arranged as an intracavity phase interferometer to simultaneously measure rotation and position relative to a reference magnetic field. Fiber ring laser 210, modulation controller 215, and detection unit 215 of system 200 can be arranged in a navigation system of a vehicle. Operation of system 210 can include making attitude measurements for a vehicle. Operation of system 210 can include measuring acceleration. With laser 210 realized as a linear laser, system 200 can include an accelerometer constructed from the linear laser.

In an embodiment, a sensitive sensor can be adapted to operate as either an absolute or reference attitude sensor. This sensitive sensor can provide measurements of both position relative to a target using a magnetometer and all three degrees of rotation (pitch, yaw, and roll) at once. In addition, the active mechanism can be adapted to be used in a linear laser, and work as an accelerometer.

In GNC systems, attitude control of a vehicle rely on accurate measurements of its position relative to a reference and motion (inertial measurements). In various embodiments, a detection system can be based on an all fiber intracavity phase interferometer (IPI) active laser capable of delivering extremely accurate simultaneous measurements of all three degrees of rotation (pitch, yaw, and roll) and position in a single, compact, cost effective unit. A variation of the same system can be made on a linear cavity laser for extremely accurate measurements of acceleration without the use of any inertial masses.

Figure 14A:
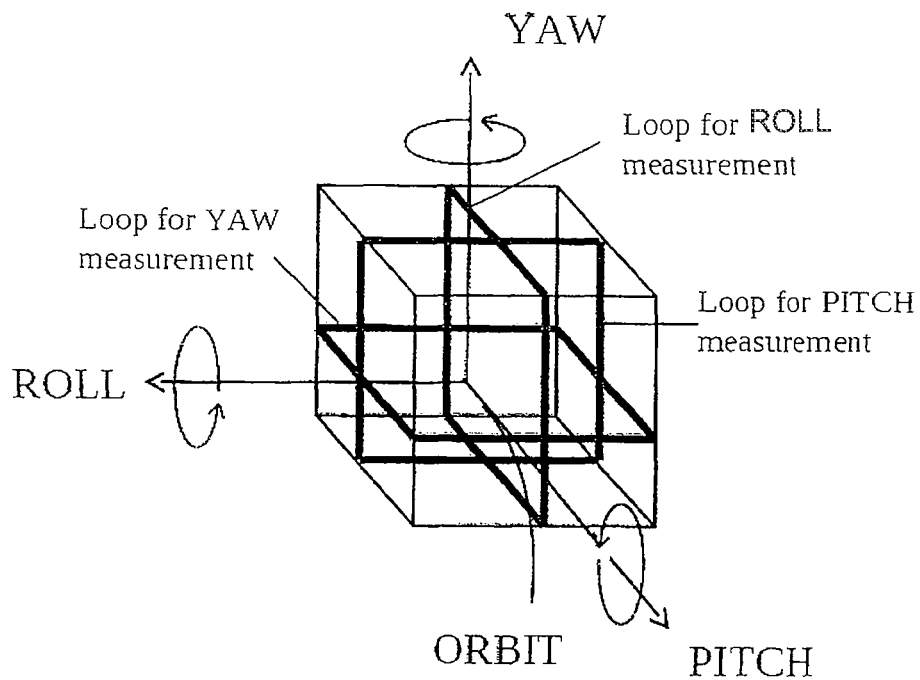
FIG. 14A shows a representation of an aircraft as a cubical element to illustrating relative attitude measurement.
Figure 14B:
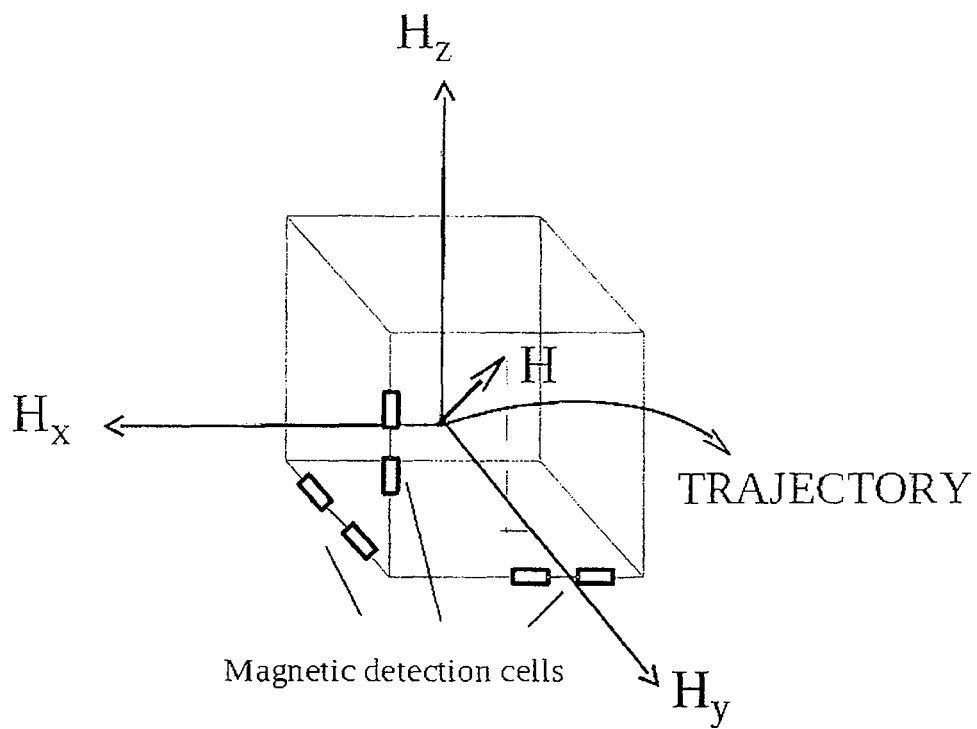
FIG. 14B shows a representation of an aircraft as a cubical element to illustrating absolute attitude measurement.

In various embodiments, a system can simultaneously measure rotation (FIG. 14A) and position relative to earth's magnetic field (FIG. 14B). Such a system can be realized with a pure solid state laser that combines the compactness and small volume of a FOG with the frequency response of an active gyro. This laser system can outperform existing laser gyros, because of the absence of dead band and associated nonlinearity in the inertial response. This concept has been demonstrated with bulk lasers for the measurement of minute displacements, magnetic fields and nonlinear index of refraction, and recently the feasibility of such an approach was demonstrated in the bidirectional mode-locked operation of a fiber laser. A basic principle, in various embodiments, includes the use of a mode-locked laser as an IPI, where two ultrashort pulses counter-circulate in the laser cavity.

Through the cavity resonance condition, a small phase difference between the two pulses, which can be caused by rotation, acceleration, or a magnetic field, translates into a frequency difference between the two output trains of pulses emitted by the laser. The frequency difference between the two output trains of pulses emitted by the laser can be picked-up as a beat note on a detector. In this approach, a phase shift of $\Delta\phi=4$ nano radians can be directly translated into a frequency difference $\Delta\phi/(2\pi\tau_{RT})=0.05$ Hz, where $\tau_{RT}=P/c$ is the round-trip time of a pulse in a laser cavity of perimeter P=4 m and c is the speed of light. In IPI, two main factors can determine the performances of a laser sensor: one being the size of the resonator or the round trip time $\tau_{RT}$ and the other being the pulse duration $\tau_p$. In situations where the goal is to measure a small phase shift $\Delta\phi$, due for instance to a magnetic field or a change in index, the beat note $\Delta\nu$ is largest for the shortest cavity, which corresponds to smallest $\tau_{RT}$. In the case of inertial measurements (rotation or acceleration), the measured beat frequency is proportional to the size of the laser. If the quantity to be measured is rotation, the differential phase shift induced by rotation is the Sagnac phase shift $\Delta\phi=8\pi A\Omega_{rot}/(c\lambda)$ and the measured beat note is:

$$\Delta\nu = 4A\Omega_{rot}/P\lambda = \rho\Omega_{rot} \quad (1)$$

where A is the area of the laser, $\lambda$ is the wavelength, $\rho$ a shape factor, and $\Omega_{rot}$ is the rotation rate to be measured.

A mode-locked fiber laser gyro can have a considerably larger geometrical factor than conventional lasers, thus making it an appealing choice for rotation measurements. In an embodiment, an IPI sensor can be based on an active bidirectional mode-locked fiber ring laser, where the laser loop area can be used as an effective rotation sensor. The loop can be encircled around an area inside a vehicle of considerable shape factor for high sensitivity to rotation. As an example, consider a satellite with a cross-section dimension of 1 m×1 m. A bidirectional mode-locked fiber ring laser with a perimeter P=4 m, at a wavelength $\lambda=1.5$ μm, when shaped into a square, has the shape factor $\rho=6.7\cdot 10^5$ Hz/s$^{-1}$, which is relatively large. In such a laser, $\Delta\nu=0.1$ Hz, which has been demonstrated with a discrete component laser, corresponds to a rotation sensitivity of 0.7°/day.

In an embodiment, an all fiber IPI can be built such that the laser generates two intra-cavity counter-circulating pulses, that is, the laser operates in a bidirectional mode-locking. The laser can be mode-locked by a combination of a passive mechanism and an active mechanism, which can be passively driven using a pair of amplitude modulators. These modulators are used to control the crossing points and threshold conditions of the system, which provides active modulation of the loss.

Figure 3:
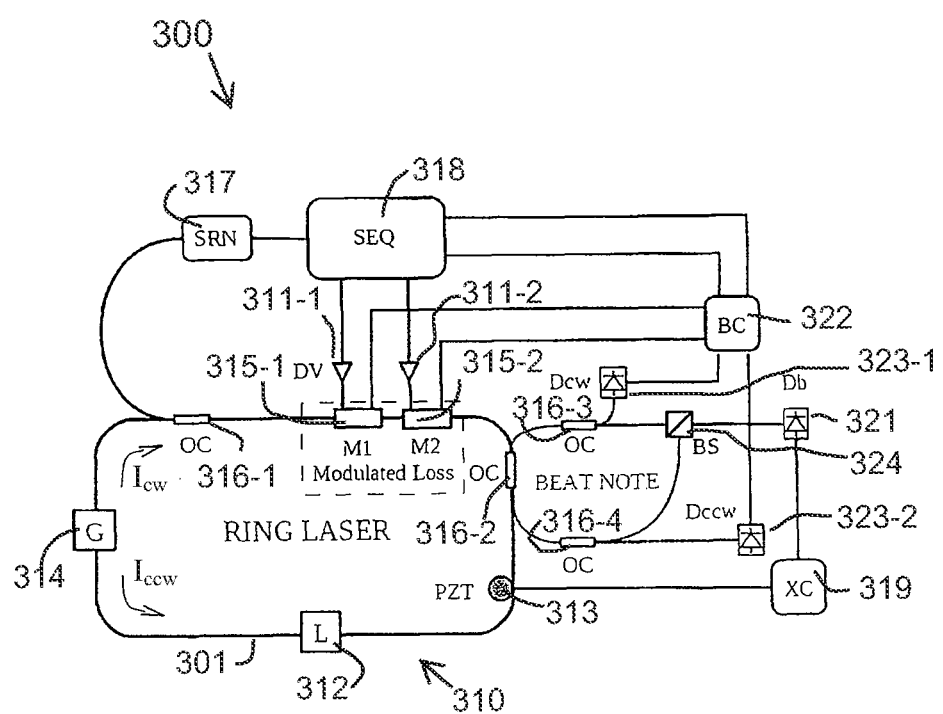
FIG. 3 shows a schematic of an example of a system using a ring laser.

FIG. 3 shows a schematic of an example embodiment of a system 300 using a ring laser. The system can be divided in three subsystems: the passive laser, the loss modulation control system, and the beat note system. The passive laser can be realized by a ring laser 310, which can be represented by lumped loss (L) 312 and lumped gain (G) 314. A signal can propagate in a clockwise (cw) direction in ring laser 310 with intensity $I_{cw}$. A signal can propagate in a counterclockwise (ccw) direction in ring laser 310 with intensity $I_{ccw}$. System 300 can also include a piezoelectric actuator (PZT) 313, optical couplers (OC) 316-1, 316-2, 316-3, and 316-4, a self-regenerative system (SRN) 317, a signal sequencer (SEQ) 318, modulators (M1, M2) 315-1 and 315-2, modulator drivers (DV) 311-1 and 311-2, a cw pulse detector (Dcw) 323-1, a ccw pulse detector (Dccw) 323-2, a beam splitter (BS) 324, a bias circuit (BC) 322, a crossing point circuit (XC) 119, and beat note detector (Db) 321.

Figure 4:
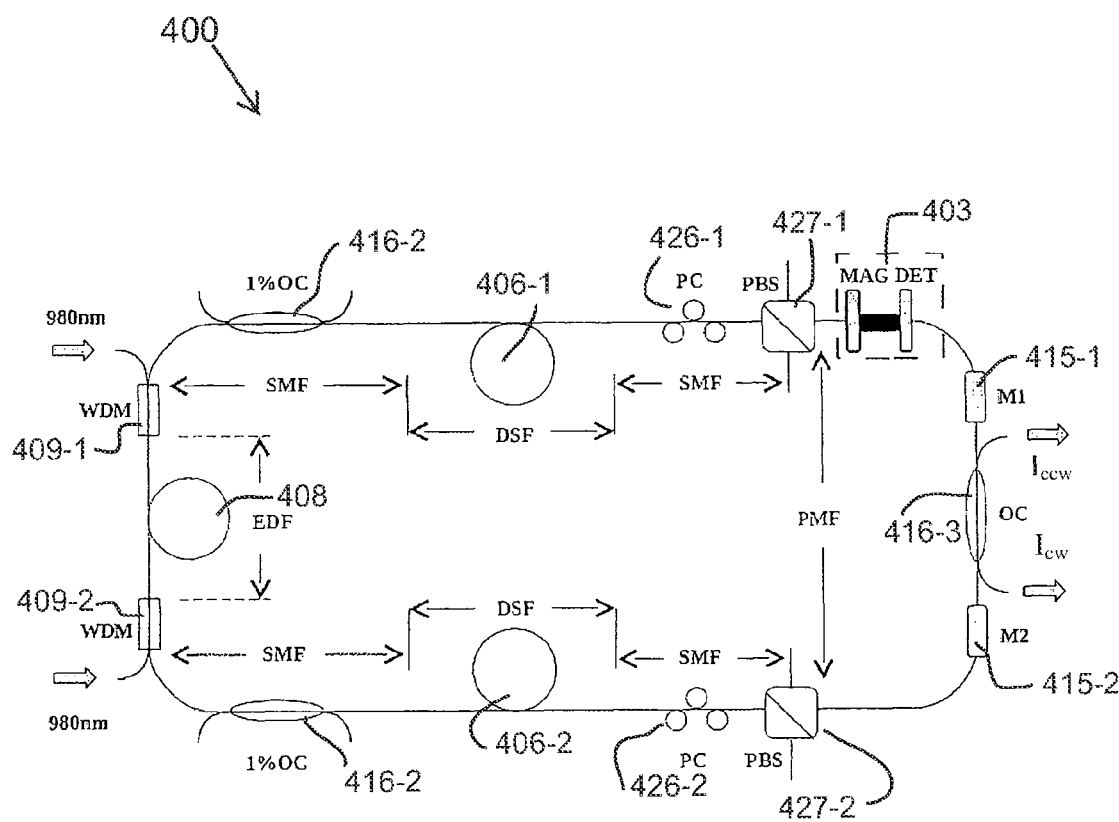
FIG. 4 shows a block diagram of an example embodiment of a passive laser system.

FIG. 4 shows an example embodiment of a passive laser system 400. The gain can be provided by a section of an erbium-doped fiber (EDF) 408 pumped by two 980 nm laser diodes connected to the laser loop by a pair of 980/1550 nm wavelength division multiplexers (WDM) 409-1 and 409-2.

Polarization controllers (PCs) 426-1 and 426-2 can be used to bias the polarization of a pulse's low intensity components to match the rejection axis of a lossy element, such as polarization beam splitters (PBS) 427-1 and 427-2, resulting in an equivalent of a fast saturable absorption effect. This technique, known as nonlinear polarization rotation (NPR) is a common mode-locking technique for unidirectional mode-locked fiber lasers, which can include the use of isolators. In the cavity of the passive laser system 400, the modulator pair (M1 and M2) 415-1, 415-2, biased for no transmission in the absence of a controlling pulse, are used rather than an isolator. A magnetic detection unit (MAG DET) 403 can be arranged in line with modulators 415-1 and 415-2. Optical couplers (OC) 416-1 and 416-2 can be used to monitor the mode-locked signals and dispersion-shifted fibers (DSF) to balance the overall group-velocity dispersion (GVD) of the laser for soliton formation. OC 416-3 can be used to direct intensities $I_{cw}$ and $I_{ccw}$ out from passive laser system 410.

Figure 5:
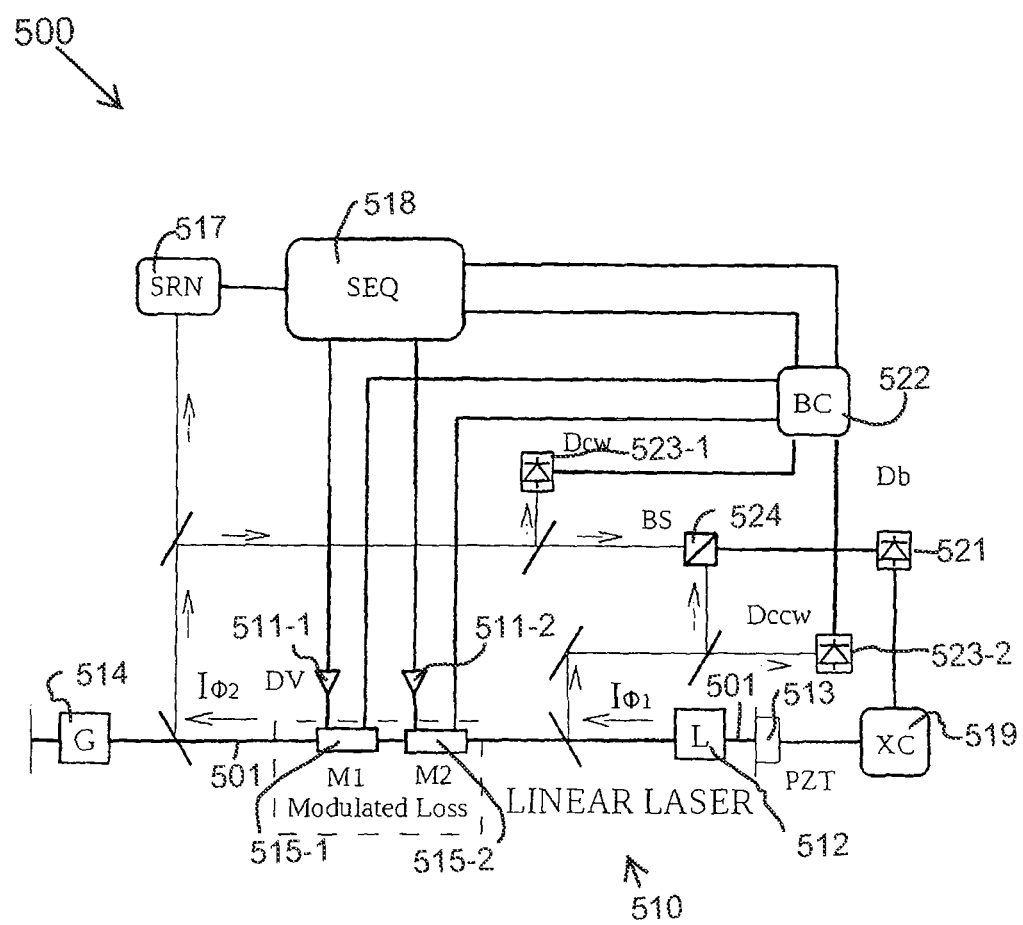
FIG. 5 shows a schematic of an example embodiment of a system using a linear cavity.

FIG. 5 shows a schematic of an example embodiment of a system 500 using a linear laser 510. The system can be divided in three subsystems: the passive laser, the loss modulation control system, and the beat note system. The passive laser can be realized by a linear laser 510, which can be represented by lumped loss (L) 512 and lumped gain (G) 514. A signal can propagate in linear laser 510 with intensity $I_{\Phi 1}$. Another signal can propagate in linear laser 510 with intensity $I_{\Phi 2}$. The system can also include a PLT 513, a SRN 517, a SEQ 518, modulators (M1, M2) 515-1 and 515-2, DVs 511-1 and 511-2, a Dcw 523-1, a Dccw 523-2, a BS 524, a BC 522, a XC 519, and a Db 521.

A loss modulation control system can be realized as an electronic feedback mechanism integrated to the laser system arrangement to provide laser stabilization, threshold gating, and crossing-point control. The laser stabilization is provided to maintain a time basis for the modulator's driving signals, which is synchronous with the oscillation rate of the laser itself. In the event of a sudden change in the repetition rate of the laser, for example temperature drifts effectively changing the overall cavity's length, or any other systematic mechanism, a RF signal can be adjusted accordingly. Instead of using an isolator, as is used with unidirectional mode-locked fiber lasers, a pair of amplitude modulator, such as modulators 315-1 and 315-2 of FIG. 3 and modulators 415-1 and 415-2 of FIG. 4 for example, can be used. These modulator pairs effectively work as an "opening" (loss lowering) and "closing" (loss increasing) threshold gating device. In addition to actively controlling the threshold of the system using the repetition rate of the laser itself, the presence of two modulators allows the control of the location where the two pulses cross as they undergo an entire round-trip travel, providing the crossing-point control.

Intracavity phase interferometry has been demonstrated as the most sensitive phase detector, and has been applied to the detection of magnetic fields, spatial displacements, and nonlinear index of refraction, just to name a few. Its significance comes from the fact that it detects frequency difference $\Delta v$ (beat note), rather than amplitude difference, between two counter-circulating light modes in a laser, by beating them together on a detector. There are however numerous challenges to overcome in implementing an efficient IPI. For instance, the smallest beat note that can be measured is limited by linear scattering from the media where the counter-propagating light interact. It can introduce a no response region known as "dead band", which is the region that limits the detection of the beat note. That is to say that, if r is the field linear backscattering coefficient of the medium, the dead band, or minimum measurable beat note $\Delta v_d$, is:

$$\Delta v_d = r/(2\pi \tau_{RT}), \quad (2)$$

where $\tau_{RT}$ is the round trip time of the laser cavity.

Using mode-locked lasers for IPI reduces the deadband, because backscattering only occurs at the crossing points and is scaled down by the width of the pulse ($r=\gamma c\tau_p$ with $\gamma$ being a constant of the medium). Therefore, the shorter the pulse duration $\tau_p$, the smaller is the dead band $\Delta v_d$. As an example, for a typical single-mode fiber ($\gamma=2.76\cdot10^{-5}$ m$^{-1}$), and a pulse duration of 100 ps, the dead band $\Delta v_d$=0.22 Hz. For 100 fs pulses, which is common in fiber laser systems, $\Delta v_d$=2.2·10$^{-4}$ Hz. A challenge here is to prevent the crossing point from moving at each round-trip, since the signal exists only if the two pulses trains overlap on the detector. A computer simulation of the nonlinear-polarization mode-locked operation, for a fiber laser implementation, has identified the cause of jitter in the crossing point, as being due to the coupling between small perturbation to the fiber and group velocity. Indeed, the fiber birefringence is affected by a small fiber motion, resulting in a modified loss at a polarizing element PBS, hence a pulse amplitude change, which changes the saturation condition in the gain fiber, in turn modifying the group velocity. It has been determined that a difference in group velocity between the counter-circulating pulses, results in a change of the arrival time of a pulse at the beat note (measurement) plane. This effect is detrimental to the beat note detection, as it compromises the overlapping of the pulse at the interference plane by degrading the fringe contrast. Solutions to this extreme sensitivity may include (i) maintaining a rigid and temperature controlled fiber structure, and (ii) actively controlling the delay line of the measurement interferometer such as by using XC 319 of FIG. 3.

Since the interface where the pulses meet is a limiting factor on the sensitivity of the system, a method has to be devised to control the crossing point of the two intracavity pulses and prevent phase coupling between them. In addition to that, reaching the potential limit of an IPI sensor poses, however, a serious challenge, because of the difficulty of interfering the ultrashort pulses on the detector. Indeed, any differential change in group velocity causes the crossing point of the pulses to drift. This is particularly true in fiber lasers, where even a small change in the phase of one pulse, for example due to a change in fiber temperature or stresses, may, in some cases, result in a group velocity change sufficient to move the pulses' crossing point by one entire pulse duration. Furthermore, as the two counter-propagating pulses travel along the laser, the order in which they pass through the different elements of the cavity causes the system to appear non-symmetric between the two. As a result, the pulses experience different threshold conditions and will display a difference in peak intensities $\Delta I$, creating a bias on the beat note response $\Delta v_b$, $$\Delta v_b = (n_2 v_g/\lambda)\Delta I, \quad (3)$$

where $n_2$ is the average nonlinear index of refraction of the laser, $v_g$ is group velocity, and $\lambda$ is the wavelength.

FIG. 6A shows effects of frequency lock-in on gyroscopic response of a laser. FIG. 6B shows effects of intra-cavity peak intensity difference on gyroscopic response of a laser. FIGS. 6A and 6B shows an example of a system with a dead band in its gyroscopic response, i.e., beat note versus rotation of the laser. The graphs show how in a real situation, the curve deviates from the ideal straight line response, and for lower values of rotation it no longer follows the line asymptotically, creating, instead, a region where there is no detection below a certain $\Omega_{min}$. FIG. 6B shows the effects of the presence of a bias on the system's response. In an embodiment, systems include an easy to implement, low cost mechanism to suppress the lock-in effect, eliminate the bias, and stabilize the location of the crossing points.

To create an efficient active bidirectional mode-locked laser to be used as an IPI sensor, one must: (i) actively control the location of the crossing points to eliminate frequency lock-in, (ii) construct a device to suppress the beat note bias $\Delta v_b$, and (iii) minimize the crossing point drift to enhance the fringe visibility (contrast) at the interference plane. FIGS. 3 and 5 show embodiments of systems that provide efficient active bidirectional mode-locked lasers, which can be used as IPI sensors. In these figures, two embodiments of an efficient active bidirectional mode-locked laser are shown with two different laser cavities: a ring laser shown in FIG. 3 and a linear laser shown in FIG. 5. The ring laser of FIG. 3 may be used for rotation and magnetic sensing, and the linear laser of FIG. 5 may be used as an accelerometer. In both figures, stable bidirectional mode-locking can be achieved by a combination of a passive mechanism, a passively driven active mechanism, and a beat note detection system. The passive mechanism is responsible for creating the optical oscillation from naturally occurring optical processes (i.e. nonlinearities, threshold conditions, soliton formation, etc.). The passive mechanism is represented by loop 301 in FIG. 3 and line 501 in FIG. 5, where G (314 in FIG. 3 and 514 in FIG. 5) represents the gain of the laser and L (312 in FIG. 3 and 512 in FIG. 5) represents the sum of all linear losses lumped on a single element.

Figure 7:
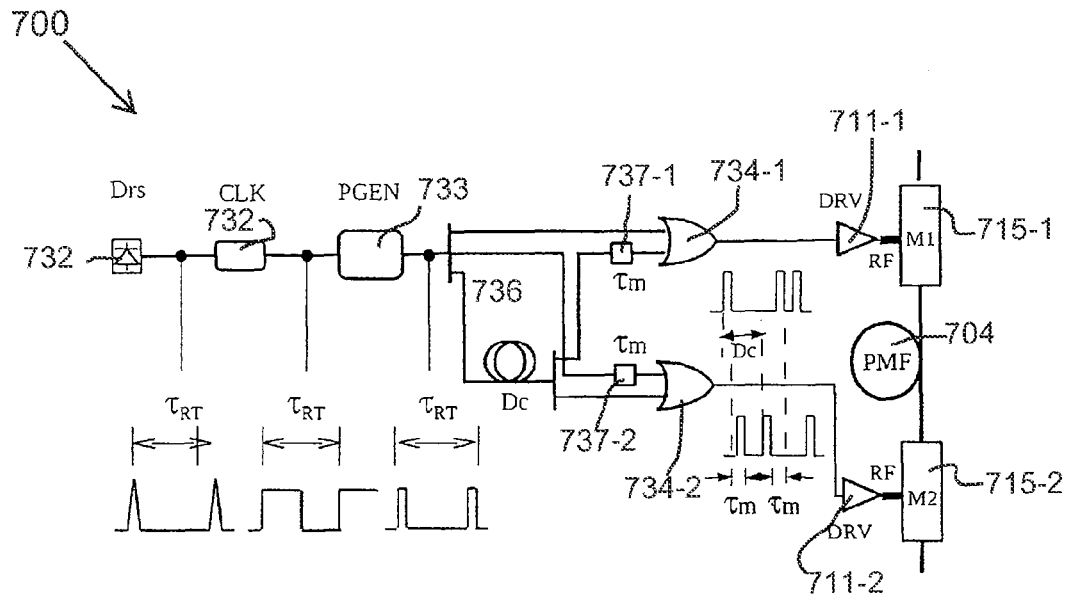
FIG. 7 shows a schematic of a self-regenerative/active sequencer system.

FIG. 7 shows a schematic of a self-regenerative/active sequencer system 700. Self-regenerative/active sequencer system 700 uses a pair of amplitude modulators 715-1 and 715-2 to control the losses of the laser, where amplitude modulators 715-1 and 715-2 can be coupled together by a polarization maintaining fiber 704. A photodetector (Drs) 731 picks up a synchronizing signal coming from the laser. The filtered signal is sent to a clock extraction mechanism (CLK) 732, which can be a synchronous oscillator or a phase-locked loop, that tracks and locks to the cavity round-trip rate. This regenerated signal, for example a 50% duty cycle signal, is used as trigger to a pulse generator (PGEN) 733 to create a narrow "squared" pulse train. This pulse train is fanned out using a buffer and sent to a pair of OR gates 734-1 and 734-2. An adjustable delay line (Dc) 736 delays one pulse train relative to the other. Its function is to move the crossing points of the optical pulses around the cavity to a place of negligible scatter, thus eliminating frequency lock-in effect. Two additional delay elements 737-1 and 737-2 provide a delay $\tau_m$, corresponding to the travel time between the modulators, ensure sequential opening/closing operations of the modulators for a given direction. Two high bandwidth drivers (DRV) 711-1 and 711-2 amplify the input signals to the modulators.

Figure 8:
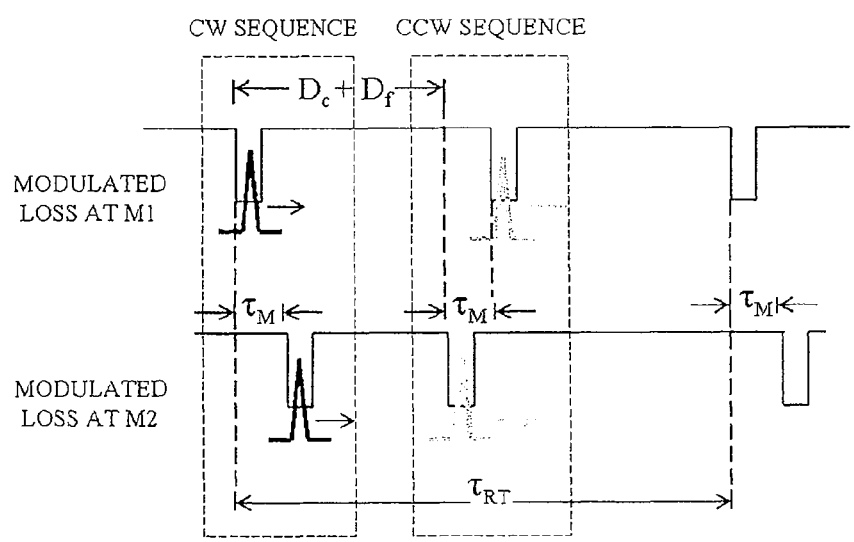
FIG. 8 shows modulated loss sequences at amplitude modulators used to create and control crossing points of clockwise and counter-clockwise pulse trains.
Figure 9:
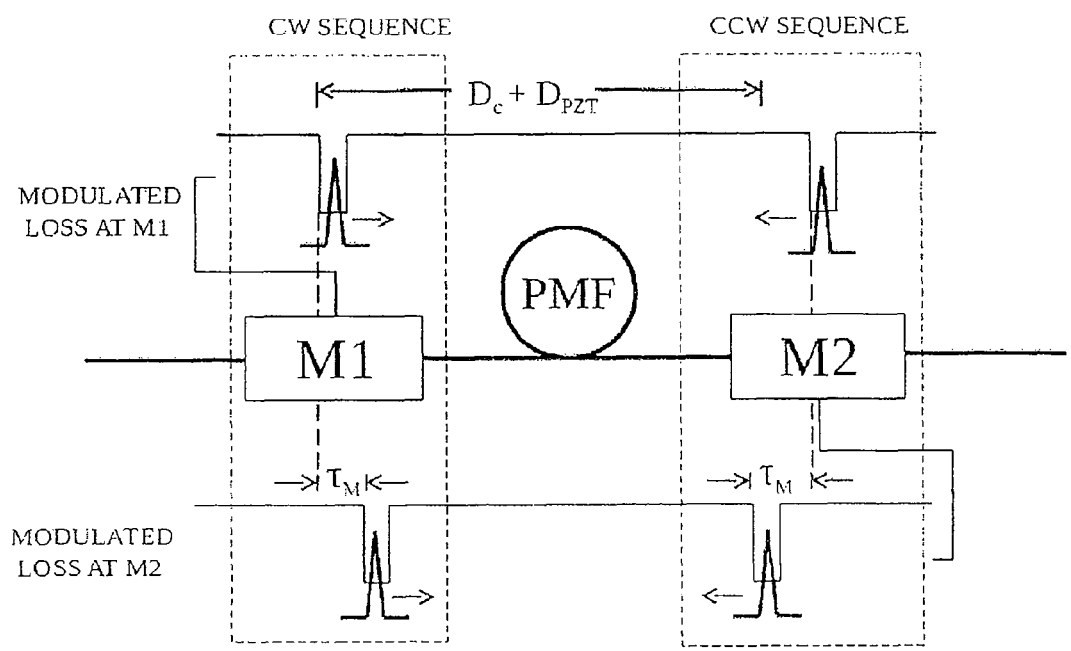
FIG. 9 shows modulated loss timing sequences with amplitude modulators used to create the clockwise and counter-clockwise pulse trains.

FIG. 8 shows modulated loss sequences at amplitude modulators used to create and control crossing points of clockwise and counter-clockwise pulse trains. It illustrates a principle behind the driving signal sequences applied to the modulator pairs used in various embodiments, in terms of their effects in modulating the loss of the laser, for the case of bidirectional pulsing in a ring laser. The same principle can be applied to a linear cavity. At each round trip, a pulse sequence, timed to "open" passage (lower the loss) for a clockwise (cw) pulse, is applied to the modulator pair, and a second sequence opens the way for the counter-clockwise (ccw) pulse. The cw pulse signal is created by opening $M_1$ and $M_2$ in a sequence equal to the travel-time between modulators $\tau_m$, where first $M_1$ opens and then $M_2$ opens $\tau_m$ seconds later. This travel time is a fixed RF propagation distance which, at each modulator, is mixed to the driving signal for the opposite direction using a logic OR gate circuit, for example, as shown in FIG. 7. An essentially identical signal is applied in reverse to create the ccw sequence. This technique allows control of the crossing points of the pulses along the ring laser, using a single adjustable delay line $D_c$, which is shown in FIG. 8 in conjunction with a fine adjustable delay $D_f$. Adjusting $D_c$ determines the firing delay between the cw and ccw sequences, thus, effectively fixing the location of the crossing points. FIG. 9 shows modulated loss timing sequences with amplitude modulators used to create the clockwise and counter-clockwise pulse trains in which a fine adjustable delay $D_f$ can be provided by a delay $D_{PZT}$ from a piezoelectric device.

To measure the beat note, the pulses can be heterodyned and monitored on an interference plane. Any sudden changes in the laser's characteristics, for example birefringence variations due to fiber motion, may destabilize the laser and perturb the location of the crossing points. This effect can be detrimental to the beat note detection, as it compromises the overlapping of the pulse at the interference plane by degrading the fringe contrast. To compensate for that, a correction mechanism, for example XC 319 in FIG. 3, can be designed to adjust the delay time of a sequence (cw or ccw) using optimization of the fringe visibility (contrast) at the image plane.

Figure 10:
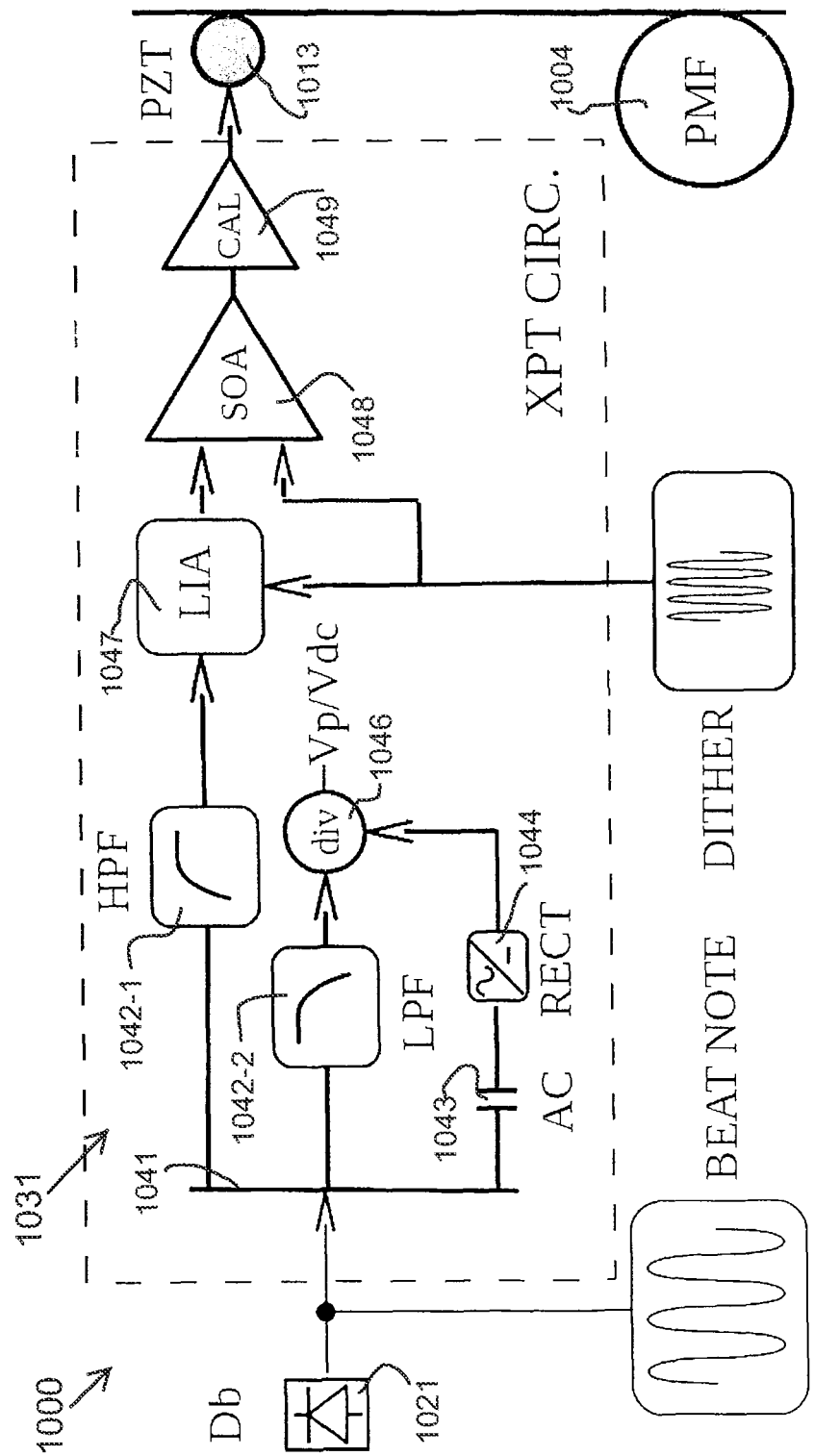
FIG. 10 shows details on the schematics of the beat note detection/crossing point control mechanism.

FIG. 10 shows a schematic of a beat note detection/crossing point control mechanism 1000. This mechanism can provide a crossing point drift suppressor and a fringe contrast enhancer. Crossing point control mechanism 1031 takes a beat note signal from a Db 1021 and sends a controlling signal to a fiber coiled piezoelectric (PZT) device 1013, which can be coupled to a PMF 1004. Beat note detection/crossing point control mechanism 1000 can include a fannout buffer 1041, a high pass filter (HPF) 1042-1, a low pass filter (LPF) 1042-2, an AC coupler (AC) 1043, a rectifier (RECT) 1044, a signal divider (div) 1046, a lock-in amplifier (LTA) 1047, a summing operational amplifier (SOA) 1048, and a calibrator (CAL) 1049. LPF 1042-2 provides DC voltage Vp and RECT 1044 provides DC voltage Vdc.

FIG. 10 illustrates the principle behind the mechanism for correction of the crossing-point drift. It is based on a known technique that uses a LIA to monitor the swing of the system about an optimum point. In this case, the optimum point is where the ratio Vp/Vdc is 1, which represents a situation of optimum contrast. To monitor the fringe contrast, the peak voltage Vp and the dc component Vdc are extracted from the beat note signal and sent to a divider 1046. The dithering signal introduced into the system by an external source DITHER is recovered using a High Pass Filter (HPF) 1042-1 and directed to LIA 1047 where it is compared to the original dithering signal. The output signal, a DC voltage, is mixed with the dither source and fed back to the system using calibrator 1049 that sends a controlling signal to a fiber coiled piezoelectric (PZT) device 1013. PZT device 1013 provides a fine time delay change Df to the coarse crossing point delay line Dc by means of a tiny cavity's length adjustment.

Figure 11:
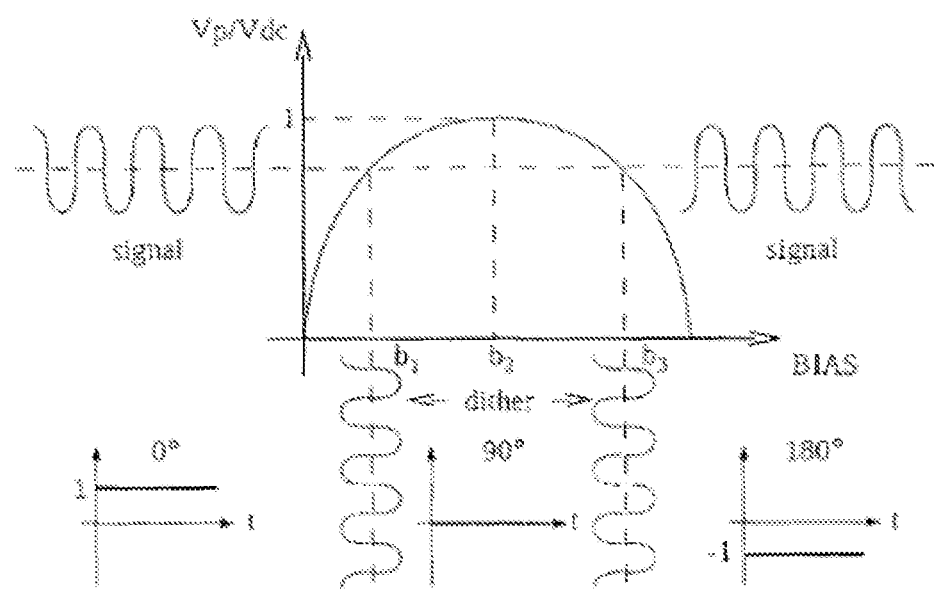
FIG. 11 shows details on the schematics of a lock-in amplifier detection/bias control scheme.

FIG. 11 illustrates the principle behind the system's response to a controlling signal applied to PZT 1013. When the signal is less than the optimum value, LIA 1047 sees it in phase with the reference dither signal and the output is 1. When it is more than the optimum value, LIA 1047 sees it 180° out of phase and the output is −1. At the optimum position, the signal is at 90° with respect to the dither signal and the output is zero. Calibrator 1049 then provides the adequate voltage gain+shift adjustment to PZT 1013, and the fringe visibility gravitates towards a scenario of optimum contrast.

In addition to the systematic motion of the crossing point, the system may be also plagued by nonreciprocal threshold conditions that cause a peak intensity difference ΔI between the counter-circulating pulses. Because of the intensity dependence of the index of refraction of the fiber (nonlinear effect), this difference of intensity results in a differential phase shift, hence a bias to the gyroscopic response. This difference can be detrimental to the measurement as much as the crossing point instability. An electronic loop can be used to maintain a zero intensity difference. In an embodiment, to eliminate this problem, a system similar to fringe visibility control system 1000 can be implemented.

Figure 12:
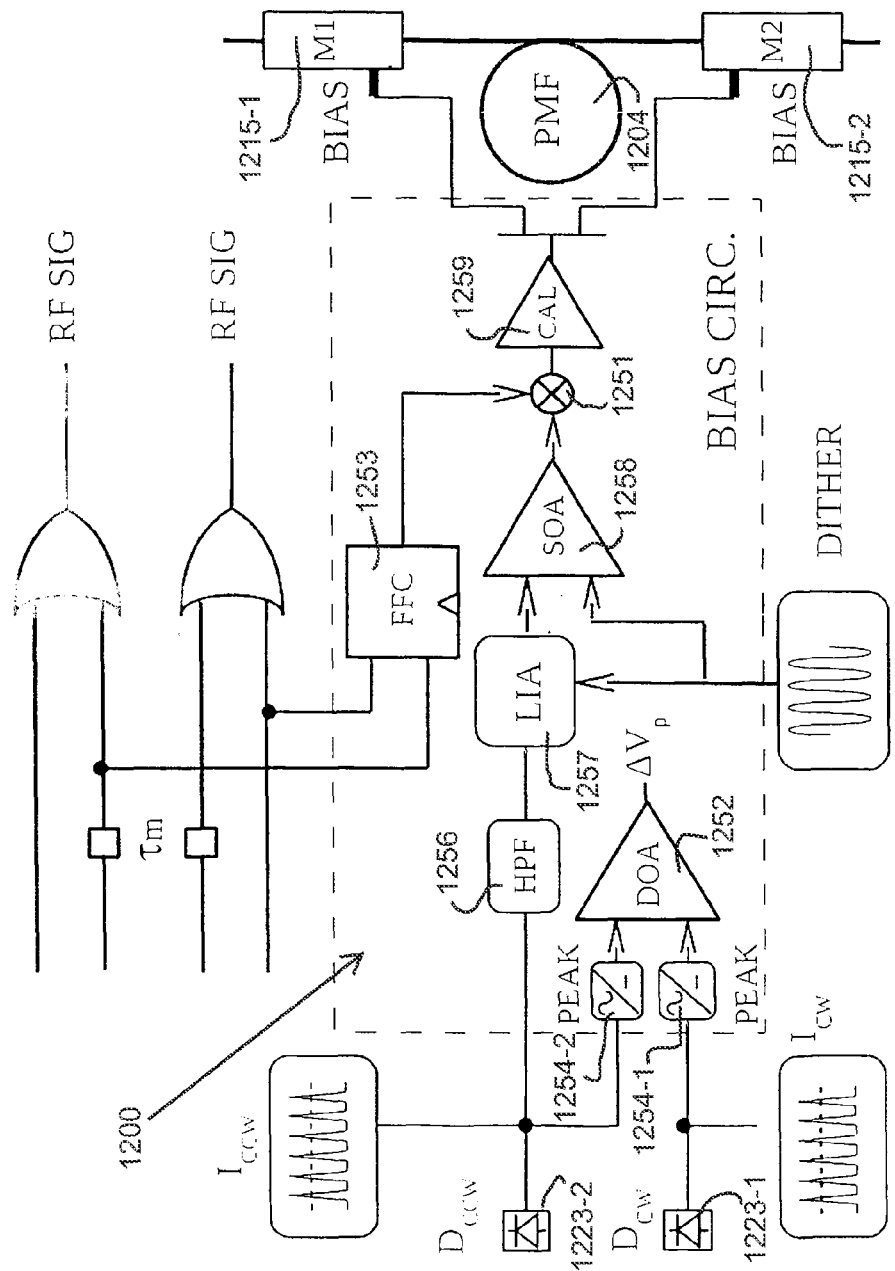
FIG. 12 shows details of a bias control circuit that is designed to equalize the peak intensity of counter-propagating pulses.

FIG. 12 shows details of a bias control circuit 1200 that is designed to equalize the peak intensity of counter-propagating pulses. Bias control circuit 1200 can be implemented as BC 322 in FIG. 3. Bias control circuit 1200 can receive input with intensity from Dcw 1223-1 and input with intensity $I_{ccw}$ from Dccw. It can, then, use the signals to monitor the difference in peak voltage from the pulse trains ΔVp by extracting the peak intensity value from each pulse train using peak detectors PEAK 1254-1 and PEAK 1254-2, and subtracting one from the other using the difference operational amplifier (DOA) 1252. Only one of the signals is used to provide output to bias ports of modulators 1215-1 and 1215-2. Modulators 1215-1 and 1215-2 can be coupled together via PMF 1204. In addition to PEAK 1254-1, PEAK 1254-2, and difference operational amplifier (DOA) 1252, bias control circuit 1200 can include a High Pass Filter (HPF) 1256, a LIA 1257, a SOA 1258, a multiplier junction 1251, a FLIP-FLOP circuit (FFC) 1253, and a CAL 1259. A delay, $\tau_m$, equal to a travel time between modulators can be provided from a delay line to FFC 1253.

In the bias control system, the monitored difference between the peak intensities of the two pulse trains is minimized. A procedure similar to the one for the crossing point control circuit is applied here, where a small dithering signal (DITHER) is introduced to the system and monitored by the LIA to determine the direction that the control signal must follow. Since the bias correction can be applied to either pulse train sequence, a mixing of the bias control signal to the timing window that it takes a sequence to pass through the two modulators must be made. This can be accomplished by multiplying the control signal to the output signal of a flip-flop circuit which sets at the leading edge of a pulse from that particular sequence just before it passes through the first modulator and re-sets just after it passes through the second modulator, thus ensuring that the controlling signal only acts on the desired pulse train. The signals used on the input to the flip-flop are tapped from the signals used on the input to the OR gates 734-1 and 734-2 in FIG. 7. With the calibrator signal applied to the bias ports of the modulators only at the time of a given sequence, only the peak intensity corresponding to that sequence will be affected, forcing the system to a situation of ΔI=0.

In various embodiments, a single mechanism is implemented to measure both absolute and relative attitude of a vehicle, in lieu of the significant number of instruments currently used for that purpose. An innovative IPI method uses an active bidirectional mode-locked laser to provide both a direct measurement of the attitude rotation vectors (pitch, yaw, and roll) and an indirect method to determine the vehicle's relative location using information of the earth's local magnetic field.

An optical gyroscope is an instrument which responds to motion. Its performance is based on the capacity to sense a phase differential between two counter-propagating beams (Sagnac Effect). Fiber lasers offer the advantage of a convenient way to manipulate the shape factor ρ (Eq. 1). For instance, a fiber ring laser with a loop stretched out on a large area may have a large ρ. One such laser can be coiled around the surface of a vehicle and have a significant area to detect angular motion around the plane of the ring loop.

Figure 13:
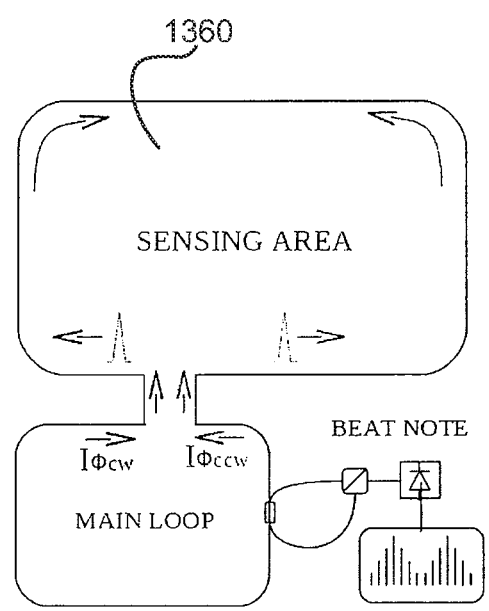
FIG. 13 shows a schematic of a relative detection mechanism.

FIG. 13 shows a schematic of a relative detection mechanism. As shown in FIG. 13, an active bidirectional fiber ring laser can be constructed with a large sensing area 1360 to detect rotation about a line perpendicular to this area. Two phase biased counter-propagating signals ($I_{cw}$ and $I_{ccw}$) are detected in response to a rotation on the sensing area plane.

Figure 15A:
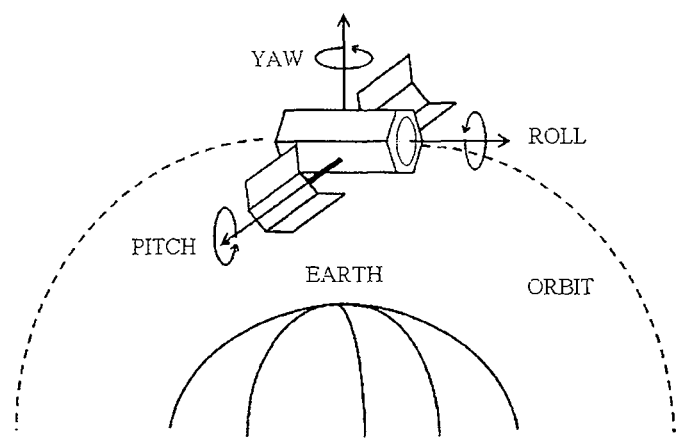
FIG. 15A shows a representation of an example embodiment of a satellite in an orbital path determined by its pitch, roll, and yaw rotation vectors.
Figure 15B:
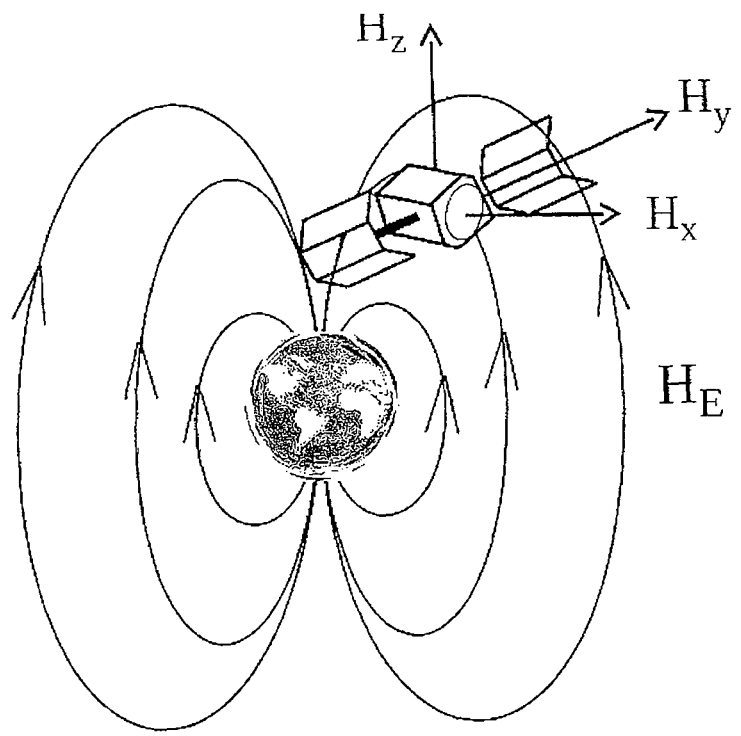
FIG. 15B shows a representation of an example embodiment a satellite along earth's magnetic field distribution.

FIG. 14A shows a representation of an aircraft as a cubical element illustrating relative attitude measurements. FIG. 14B shows a representation of an aircraft as a cubical element illustrating absolute attitude measurements. In a navigation system, three degrees of rotation are used to characterize the vehicle's attitude. FIG. 15A shows a representation of an example embodiment of a satellite in an orbital path determined by its pitch, roll, and yaw rotation vectors. Pitch, roll, and yaw rotation vectors are attitude rotation vectors that characterize the satellite moving around the orbital path. The satellite of FIG. 15A is just one out of many examples of vehicle embodiments. FIG. 15B shows a representation of an example embodiment a satellite along earth's magnetic field distribution.

Figure 16:
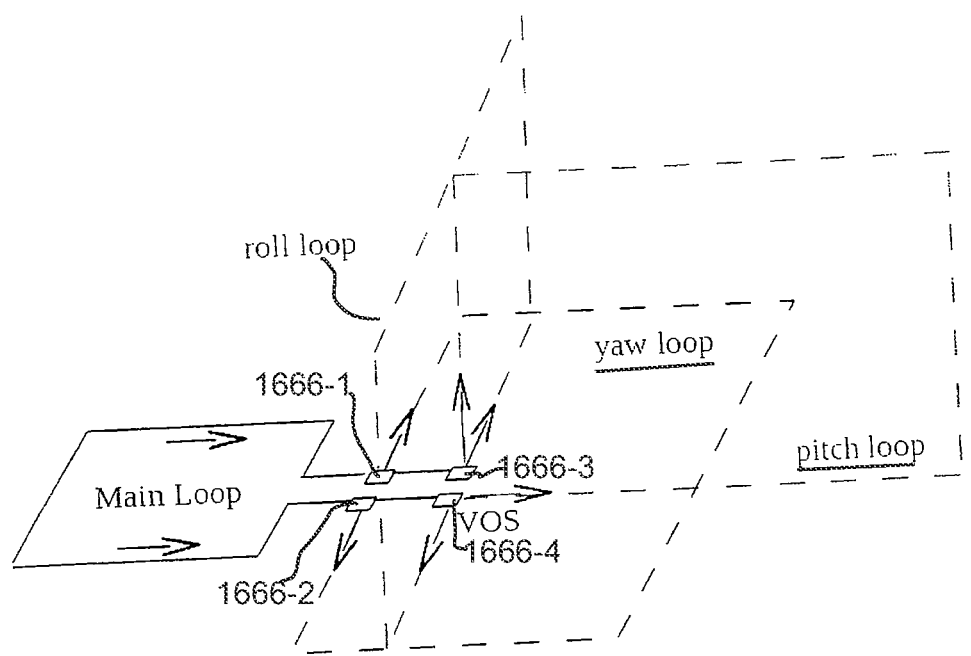
FIG. 16 shows a schematic of a mechanism to detect three-dimensional rotation.

In various embodiments, three separate laser paths (loops) can be used for detection of each rotation. To detect rotation on all three dimensions, three loops can be coiled around a sectional volume of the spacecraft as shown in FIG. 14A. FIG. 16 shows a schematic of a mechanism to detect three-dimensional (3D) rotation. The main loop sweeps over those areas using voltage controlled optical switches (VOS) 1666-1, 1666-2, 1666-3, and 1666-4. The timing of the switch in paths can be controlled using a logic circuit designed to conduct a measurement on a precisely timed basis. In other words, there is no limitation on how long the laser can oscillate in each loop, and how many cycles can a single measurement of the beat note be averaged on, except for limitations on the response of the switches themselves.

In various embodiments, IPI lasers can be applied to the detection of magnetic fields by exploiting the Faraday effect. In this effect, two counter-propagating beams, traveling along the direction of a magnetic field B, one with right-circularly polarized light and the other with left circularly polarized light, experience a phase difference Δϕ. This phase difference is detected as a beat note, $$\Delta v_m = \frac{\Delta \phi}{2\pi \tau_{RT}} = \frac{VBl}{180° \tau_{RT}}, \quad (4)$$

where l is the length of the sample over which the field is measured, B=μH the magnetic flux density, μ is the permeability of the magnetic medium, H is the magnetic field, and V is known as the Verdet constant of the material. A measurement of earth's local magnetic field can be used to determine the precise location of a vehicle, such as an aircraft, relative to earth.

FIG. 15B shows a satellite navigating along earth's magnetic field $H_E$. Each position of the aircraft is uniquely characterized by the local fields' direction and intensity. Field intensity decreases with distance to earth, and direction follows the magnetic lines. A precise measurement of earth's magnetic field at a specific location can be made using the three loops described above. Each loop senses the magnetic component at a different direction (X, Y, Z). The resultant has the magnitude and direction of the field at a given position.

Figure 17:
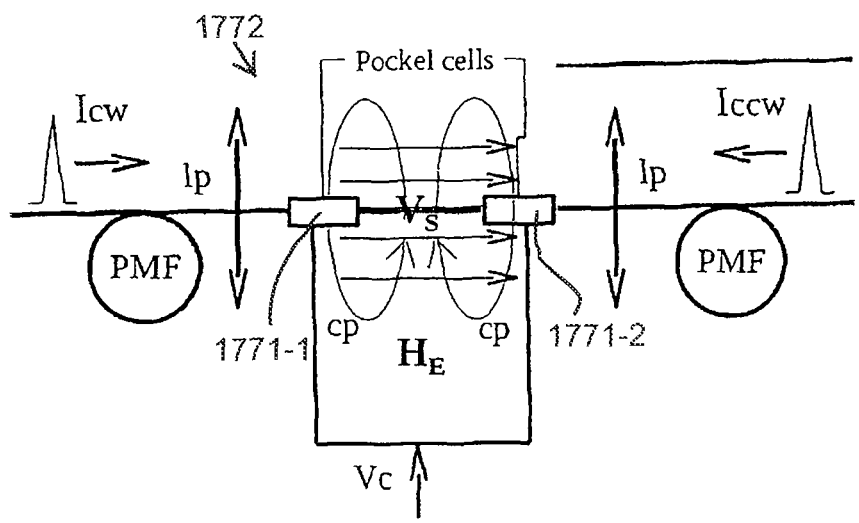
FIG. 17 shows an example embodiment of a magnetic field detection cell.

In the cubical representation of the aircraft shown in FIG. 14B, the orthogonal planes of the cube represent the planes of the fiber loops, all three in "magnetic sensing mode". At the center of the cube, the magnetic field line is shown with the local earth field $H_E$ tangential to it. FIG. 17 shows an example embodiment of a magnetic field detection cell 1772 subject to the local earth field $H_E$. To switch from rotation to magnetic sensing mode, two Pockels cells 1771-1 and 1771-2 can be placed in a small section of the loop as shown in FIG. 17. Pockels cells 1771-1 and 1771-2, surrounding a magnetic material with Verdet constant of $V_S$, are controlled by controlling voltage Vc. The loops can be made of PMF. Clockwise/counter-clockwise pulse intensities, $I_{cw}$ and $I_{ccw}$, are introduced to PMFs on either side of Pockels cells 1771-1 and 1771-2. In the PMF sections, light propagates as linearly polarized light (lp). The linearly polarized light is aligned to one of the major axis of the PMF. Linearly polarized light becomes circularly polarized light (cp) after passing through Pockels cells 1771-1 and 1771-2. They pick up a phase difference as they pass the magnetic material of Verdet constant V. After passing again through the Pockel cells 1771-1 and 1771-2 they go back to becoming linearly polarized again.

Figure 18:
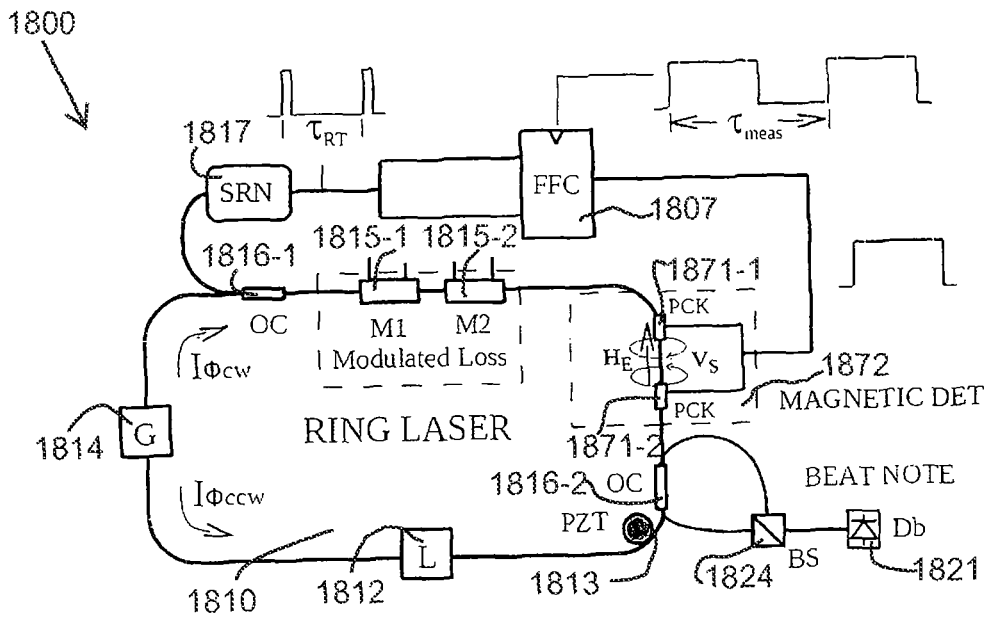
FIG. 18 shows a schematic of an example ring laser setup for sensitive magnetic detection.

FIG. 18 shows an embodiment of a setup 1800 to measure a localized magnetic field. Setup 1800 can include a ring laser 1810, which can be represented by lumped loss (L) 1812 and lumped gain (G) 1814. A signal can propagate in a clockwise (cw) direction in ring laser 1810 with intensity $I_{cw}$. A signal can propagate in a counterclockwise (ccw) direction in ring laser 1810 with intensity $I_{ccw}$. Setup 1800 can also include a PZT 1813, OCs 1816-1 and 1816-2, a SRN 1817, modulators (M1, M2) 1815-1 and 1815-2, a BS 1824, a Db 1821, a flip-flop circuit 1807, and a magnetic detection unit 1872. Magnetic detection unit 1872 arranged in-line with fiber of ring laser 1810 can include Pockels cells 1771-1 and 1771-2 surrounding magnetic material with Verdet constant of $V_S$. Magnetic detection unit 1872 can be structured similar or identical to magnetic field detection cell 1772 of FIG. 17. The timing window of the measurement, $\tau_{mea}$, can be determined by a controlling signal from flip-flop circuit 1807.

With respect to setup 1800, a sample material of Verdet constant $V_S$ is introduced in a polarization maintaining branch of the laser, surrounded by two Pockel cells intended to switch a pulse's polarization from linear to circular. Inside the sample, light will be right circularly polarized for a pulse coming from one direction, and left circularly polarized for the pulse coming in the opposite direction. The counter-propagating pulses passing through this area will experience a different phase shift proportional to the magnetic field, and a beat note will be detected as described in Eq. (4). A single mode fiber can be used, for example, as the sample material. Because the loops can be the same used for rotation measurements, they can be made in large areas, and, thus, part of the detected beat note will be sensitive to rotation as well. This bias, imparted to the system due to motion, must be factored out from the beat note. The rotation contribution $\Delta v_{rot}$, measured in a previous detection cycle, should be subtracted from the measurement $\Delta v_{meas}$ involving the magnetic loop. Since, for each loop, the beat note due to rotation is known from a previous measurement cycle, the beat note due to the magnetic field is $\Delta v_m = \Delta v_{meas} - \Delta v_{rot}$, where $\Delta v_m$ is the detected beat note. Here, again, switching from one measurement to the other, in this case rotation to magnetic (position) sensing, can be timed using a logic circuit to drive the Pockel cells. As in the inertial measurement case, the timing between rotation and position measurement is completely arbitrary and depends only on how many cycles per beat note measurement is desired, and limited only by the response of the Pockel cells.

In various embodiments, in addition to relative and absolute aircraft detection, a mechanism to detect acceleration is provided. Such a mechanism can work as follows. A linear cavity with two pulses per cavity round trip is the limit of a stretched-out ring laser. In the ring laser, the two intracavity pulses cross always at the same point related to the laboratory frame, while the carrier frequency makes an interference pattern that is related to an absolute frame of reference (i.e. not accelerating). As mentioned, the measured beat note $\Delta v$ represents the change $\Delta \phi$ of the carrier to envelope phase at each cavity round-trip $\tau_{RT} = P/c$, i.e. $\Delta v = \Delta \phi / \tau_{RT}$. In the linear cavity with two pulses per cavity round-trip, the two intracavity pulses also cross always at the same point relative to the laser or laboratory frame, close to the one end mirror of the cavity, as sketched in FIG. 19. One pulse, upon reflection on $M_2$, experiences a Doppler shift, $(v/c)\nu$, where $\nu$ is the light frequency, and v the mirror velocity. When the other pulse hits the other mirror ($M_1$), the Doppler shift is $(v + a\tau_{RT}/2)\nu/c$, where "a" is the acceleration and $\tau_{RT}$ is the round trip time. The beat note measured is the difference in Doppler shifts, $a\tau_{RT}\nu/2c$. The application to acceleration measurement does not involve any inertial mass, as opposed to standard accelerometers.

Figure 19:
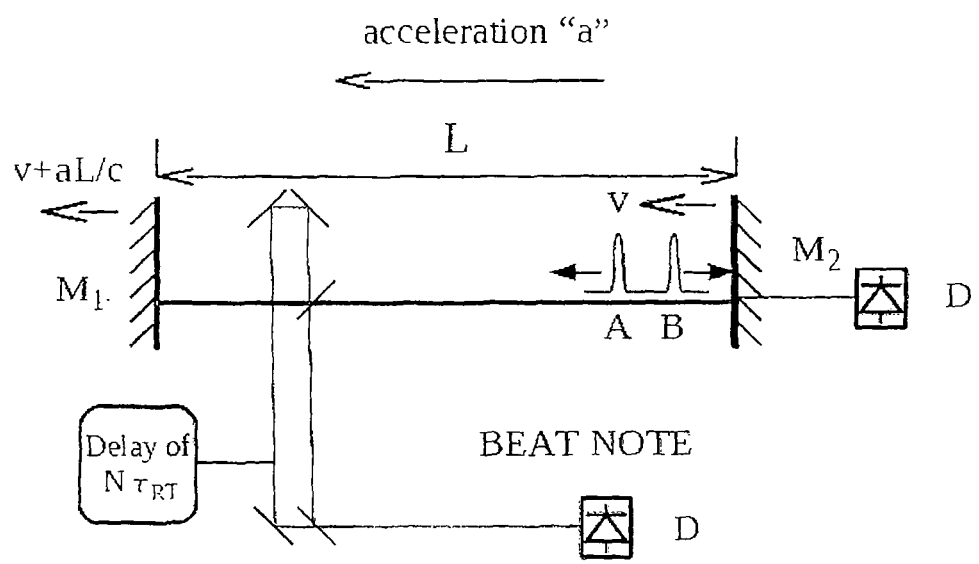
FIG. 19 shows a schematic of a mechanism to detect acceleration using a linear stretched out laser cavity.

The crossing point in the laser cavity in FIG. 19 can be controlled with the insertion of the active scheme, as shown for example in FIG. 5. After reflection on the left mirror shown in FIG. 19, the pulse A is reflected on an output coupling plate and sent to a delay line to make it interfere with pulse B that has been reflected on the right mirror. A number of cavity round-trips can be added in the detection delay line, to increase the sensitivity to acceleration. A long delay line can be constructed with a dispersion compensated fiber, and efficiently used in vehicle acceleration sensing. If N is the ratio of this delay to the cavity length L, the acceleration that can be resolved is:

$$a = (\lambda/N_{RT})\Delta v_B \quad (5)$$

For example, with a delay line of 3 km, and a cavity with $\tau_{RT} = 10$ ns, N≈1000. At a wavelength of 1.5 μm, with a minimum resolvable $\Delta v_B \approx 1$ Hz (the case of an unstabilized cavity), the minimum detectable acceleration is $a \approx 1.5 \cdot 10^{-6}/(10^3 \times 10^{-8}) = 0.15$ m/s². This figure can be improved by $10^3$ with stabilization brought by the active mechanism, leading to a sensitivity to acceleration of 100 μm/s². This approach can be realized as a purely optical approach, with a low power fiber laser, and not involving any moving or deformable mass.

In various embodiments, improvements/innovations can be realized for navigation systems, such as aircraft navigation systems. The systems and processes described herein can provide highly accurate measurements. Unlike conventional motion detection devices used in satellite's navigation systems, an all fiber IPI sensor, for example, in accordance with various embodiments provides an innovative and unique way to detect rotation, which not until recently had only been implemented with discrete component solid state lasers. The all fiber IPI sensor, for instance, is fundamentally different from the standard passive Fiber Optical Gyro (FOG), which is a passive device in which the measured difference in phase induced by rotation is translated into a difference in intensity. To illustrate this performance difference, assume, for instance, that a rotation results in a phase difference of $\Delta \phi = 4$ nano radians. For such a small phase difference, $\cos^2(\Delta\phi) \approx 1 - 2\Delta\phi^2$. A detector has to resolve a change in intensity better than one part in $10^{16}$, which is comparable to distinguishing a change of 1 nanovolt in a signal of 10 million volts. The best voltmeter on the market today specifies 8.5 digit resolution, at least several orders of magnitude away from measuring this phase shift. In the approach described herein, a phase shift of $\Delta\phi=4$ nano radians is directly translated into a frequency $\Delta\phi/(2\pi\tau_{RT})\approx 0.05$ Hz (in a laser cavity of perimeter P=4 m), corresponding to a sensitivity to rotation of 0.37°/day. Stabilization of the cavity perimeter may improve these figures by several orders of magnitude, making it better than any navigational optical gyroscope of today.

Various systems and processes described herein can provide versatility. Not only can such systems perform inertial measurements, these systems can simultaneously detect position. Because the architectures of the electronics components are not sophisticated, the main loop of the system can be easily scaled down to a compact sized machine. Furthermore, such systems can be applied to a variety of vehicles, such as airplanes, guided missiles, submarines, UAVs, and satellites, just to name a few.

In various embodiments, systems and processes described herein can provide an innovative active approach to bidirectional mode-locking that solves three major problems associated with its application to IPI. With respect to frequency unlocking, using bidirectional mode-locked lasers as IPIs is always challenging, because of the difficulty to keep the counter-circulating pulses from crossing at a highly scattering interface, for example a splice in a fiber or a saturable absorber in a laser. By controlling the location of the crossing-points, systems and processes in various embodiments of the invention provides a solution to the scattering problem, the systems and processes described herein demonstrate a mechanism to control the crossing point using an easy to implement logic circuit.

With respect to crossing point stabilization, systems and processes in various embodiments of the invention provide a method to nullify the effects of crossing point drifts using a feedback system designed to maximize the fringe visibility of the beat note. Such systems can be implemented with simple electronics devices.

With respect to beat note bias suppression, systems and processes in various embodiments of the invention provide a method to eliminate non-symmetrical cavity effects on the peak intensity of the counter-propagating pulses. A bias suppression mechanism can be used that acts directly on the modulation of the system, effectively changing its threshold conditions.

In guidance, navigation, and control systems, attitude control of a vehicle must rely on accurate measurements of its position (relative to a reference), and motion (inertial measurements). To ascertain its precise attitude, spacecrafts, for example, use a number of sophisticated, on-board, instruments, such as sun/horizon sensors, star trackers, orbital gyrocompasses, for position determination, and spinning mass, hemispherical resonators, and laser gyros for inertial navigation. This later class of sensors is predominantly dominated by He—Ne and fiber optic gyro technology, which typically are high power consuming, shock sensitive, low efficiency instruments, some of which contain moving mechanical parts subject to wear offs and jam, not to mention the fact that they are particularly expensive. In various embodiments, an innovative, detection system can be based on an all fiber intracavity phase interferometer (IPI) active laser capable of delivering extremely accurate simultaneous measurements of all three degrees of rotation (pitch, yaw, and roll), and position in a single, compact, cost effective unit. The position measurement may be realized using a magnetometer.

Mode-locked fiber lasers provide a sensing mechanism that can be used as IPIs and deliver measurements with unlimited precision and lower energy consumption without the need for any moving mechanical parts. In various embodiments, a system using mode-locked fiber lasers as IPIs can provide high sensitivity inertial and position measurements using a single detection mechanism. It has the potential to considerably improve the sensitivity and reliability of vehicle attitude sensing, with the potential of becoming the new standard for the next generation of sensors in navigation systems. Rotation and position can be detected using an all fiber IPI sensor, which may be implemented in integrated form. Such systems can be designed to be applicable to spacecrafts, since these systems are lightweight, sensitive, and have low power consumption. However, in other type of aircrafts, such as unmanned aerial vehicles or commercial aircrafts, the recording of fast motion may be averaged out.

In guidance, navigation, and control systems, attitude control of a vehicle rely on accurate measurements of its position (relative to a reference), and motion (inertial measurements). In various embodiments, a detection system can be based on an all fiber intracavity phase interferometer (IPI) active laser capable of delivering extremely accurate simultaneous measurements of all three degrees of rotation (pitch, yaw, and roll), and position in a single, compact, cost effective unit. A variation of the same system can be made on a linear cavity laser for extremely accurate measurements of acceleration without the use of any inertial masses.

Although specific embodiments have been illustrated and described herein, it will be appreciated by those of ordinary skill in the art that any arrangement that is calculated to achieve the same purpose may be substituted for the specific embodiments shown. Upon studying the disclosure, it will be apparent to those skilled in the art that various modifications and variations can be made in the devices and methods of various embodiments of the invention. Various embodiments can use permutations and/or combinations of embodiments described herein. Other embodiments will be apparent to those skilled in the art from consideration of the specification and practice of the embodiments disclosed herein. It is to be understood that the above description is intended to be illustrative, and not restrictive, and that the phraseology or terminology employed herein is for the purpose of description.

What is claimed is:

1. A method comprising:
operating a mode-locked laser arranged as an intracavity phase interferometer to simultaneously measure rotation and position relative to a reference magnetic field, the mode-locked laser including a laser, a modulation controller coupled to the laser, the modulation controller arranged to modulate loss in the laser, and a detection unit coupled to the laser, the detection unit structured to detect differences in counter-propagating optical signals in the laser and to provide a control signal to the modulation controller.

2. The method of claim 1, wherein the method includes making attitude measurements for a vehicle.

3. The method of claim 1, wherein the method includes measuring acceleration by operating a linear laser, arranged as the laser in the mode-locked laser, without use of an inertial mass.

4. The method of claim 1, wherein the method includes operating the mode-locked laser using a magnetic detection unit by applying a control signal to a Pockels cell arranged in the magnetic detection unit in-line with a fiber loop of the mode-locked laser.

5. A system comprising:
a laser;
a modulation controller coupled to the laser, the modulation controller arranged to modulate loss in the laser; and
a detection unit coupled to the laser, the detection unit structured to detect differences in counter-propagating optical signals in the laser and to provide a control signal to the modulation controller.

6. The system of claim 5, wherein the modulation controller is arranged to modulate loss in the laser based on an oscillation rate of the laser.

7. The system of claim 5, wherein the modulation controller includes a pair of modulators structured to be biased for no transmission in an absence of a controlling pulse.

8. The system of claim 5, wherein the laser includes a fiber ring laser.

9. The system of claim 8, wherein the system includes a magnetic detector disposed in-line with fiber of the fiber ring laser.

10. The system of claim 8, wherein the magnetic detector includes a Pockels cell.

11. The system of claim 8, wherein the fiber ring laser includes an erbium-doped fiber to provide a gain medium.

12. The system of claim 8, wherein the fiber ring laser, the modulation controller, and the detection unit are arranged as an intracavity phase interferometer.

13. The system of claim 12, wherein the fiber ring laser, the modulation controller, and the detection unit are arranged to simultaneously measure rotation and position relative to a reference magnetic field.

14. The system of claim 12, wherein the fiber ring laser, the modulation controller, and the detection unit are arranged in a navigation system of a vehicle.

15. The system of claim 12, wherein the fiber ring laser includes a fiber loop encircled around an area inside the vehicle.

16. The system of claim 5, wherein the laser includes a linear laser.

17. The system of claim 16, wherein the system includes an accelerometer constructed from the linear laser without use of an inertial mass.

18. The system of claim 5, wherein the modulation controller includes an electronic feedback including a piezoelectric actuator coupled to a beat note detector.

19. The system of claim 5, wherein the modulation controller includes an electronic feedback including drivers to control a pair of amplitude modulators coupled to a fiber loop of the laser.

* * * * *